W. P. BIDELMAN.
REINFORCED JOINT FOR CARBON ELECTRODES.
APPLICATION FILED OCT. 1, 1918.

1,304,444.

Patented May 20, 1919.

INVENTOR.
William P. Bidelman,
BY Hazard & Miller
ATTORNEYS

UNITED STATES PATENT OFFICE.

WILLIAM P. BIDELMAN, OF LOS ANGELES, CALIFORNIA.

REINFORCED JOINT FOR CARBON ELECTRODES.

1,304,444.  Specification of Letters Patent.  Patented May 20, 1919.

Application filed October 1, 1918. Serial No. 256,463.

*To all whom it may concern:*

Be it known that I, WILLIAM P. BIDELMAN, a citizen of the United States, residing at Los Angeles, in the county of Los Angeles and State of California, have invented new and useful Improvements in Reinforced Joints for Carbon Electrodes, of which the following is a specification.

My invention relates to a reinforced joint for carbon electrodes.

In the ordinary type of electric furnaces for metallurgical operations, a number of carbon electrodes are used of a length from 32 to 60 inches, said electrodes being cylindrical, having a diameter of 6 inches. As the carbon electrodes are gradually used up in the operation in the controller, it is necessary at frequent intervals to join another length of carbon electrode to the electrode in use. The ordinary method of joining the adjacent ends of the carbon electrodes together was by providing each adjacent end with a threaded socket 3 inches in diameter and about 6 inches deep. A corresponding cylindrical threaded carbon block or core was screwed into the threaded sockets, thereby forming a joint. The objection to this joint was that it weakened the carbon electrode at this point, there being only the thickness of the core which was approximately one-fourth of the cross sectional area of the electrode so that frequently a breakage would occur at the joint, especially within the furnace itself. If for any reason the length of the carbon within the furnace encountered an obstacle, the carbon electrode would break off at the joint and fall into the material being treated, thereby, in the case of smelting of steel and the like, necessitating a shut-down to remove the broken end of the carbon electrode through the furnace door. Such removal is usually a difficult and arduous operation, especially in the case where scrap metal is smelted down. The carbon electrodes, during the operation usually burn vertical holes through the mass of scrap metal and the broken end of the electrode, would be lodged within one of the holes, occasionally frozen tight. On an average one carbon electrode would break during the day in a furnace, which means a loss of thirty minutes to bring the furnace back to normal operating conditions at the time when the breakage occurred.

It is an object of this invention to provide a simple, yet efficient, joint for carbon electrodes positively preventing breakage at this point and thus increasing the efficiency of the furnace and preventing expensive shutdowns.

My invention consists in the construction, combination and arrangement of parts hereinafter described and claimed.

In the accompanying drawings which form a part of my invention, I have shown a preferred embodiment of the same and in which Figure 1 is a front elevation of a type of electric furnace with parts broken away to show the electrodes in operation to which my invention is applied.

Figure 1:
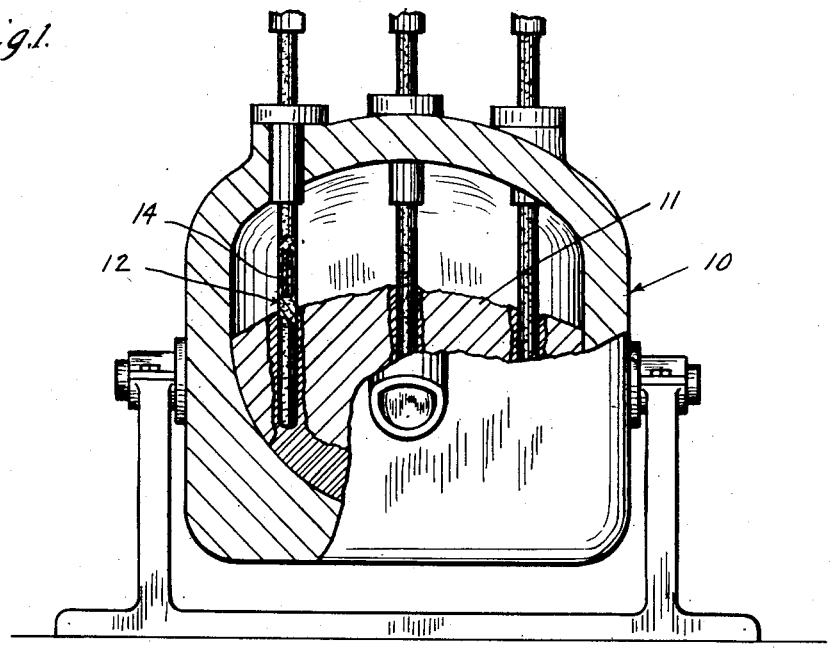

Referring to the drawings, 10 indicates a tiltable electric furnace of any preferred construction. 11 is a mass of material to be melted. 12 are the carbon electrodes, in this case three in number, passing through the roof of the furnace vertically downward and to the mass of metal. Any usual or preferred mechanism for operating electrodes and water cooling the upper ends thereof, may be used. They are not shown, as they form no part of the present invention which relates solely to the means for joining adjacent ends of lengths of carbon electrodes together.

Figure 2:
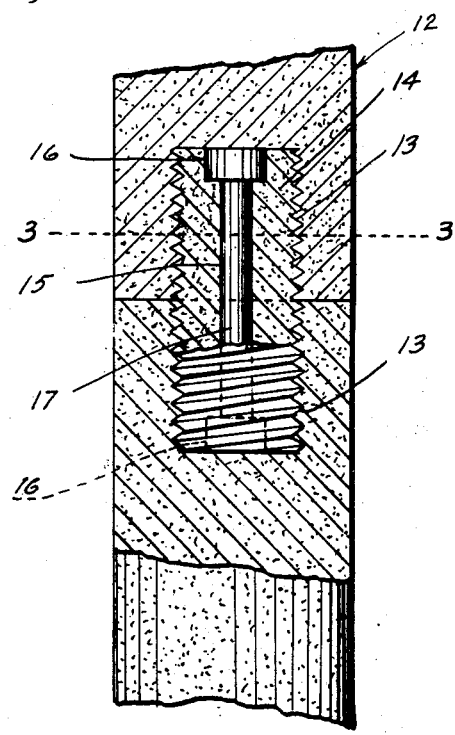
Fig. 2 is a vertical central section of the joint, some of the parts being shown in elevation for clearness of illustration.
Figure 3:
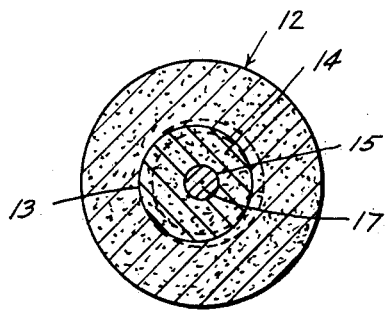
Fig. 3 is a horizontal section taken on line 3—3 of Fig. 2.

I have shown my invention in connection with the construction of the standard carbon electrodes in the market which, as before stated, are the length from 32 to 60 inches, having a diameter of 6 inches, and which are provided, as shown in Fig. 2, at their adjacent ends with cylindrical threaded sockets 13, for the reception of a cylindrical threaded carbon core or bolt 14, the ends of the electrodes 12 when screwed together about the bolt 14 forming a tight joint. I take the core 14 and bore a hole 15 throughout the length of its axis, counter boring opposite ends of the bore 15 to provide head sockets 16. I take the carbon core 14 and fill the central bore and the head sockets with metal, the metal corresponding to the metal smelted down in the furnace. In the case of steel, I use steel or iron, and in the case of brass, I use brass. In place of filling the central bolt 15 of the core 14 with molten metal I may simply use a metal bolt with a head on one side and a nut on the other, I have found by actual operation that a joint construction as described will not break, neither will it melt in the furnace until the lower end of the metal rod 17 is exposed to the direct heat of the furnace. The walls of the core 14 in which the metal rod 17 is embedded act as heat insulating means preventing its being molten until the lower end is exposed to the direct heat. It may be found desirable in some instances in the smelting of high carbon steel to use a low carbon steel rod in the core 14 which, as is well known, has a higher melting point than high carbon steel. I have found, however, that in ordinary practice such a modification is not necessary.

While I have shown the preferred construction of the carbon electrode joint, as now known to me, it will be understood that various changes in the construction and combination of parts may be made by those skilled in the art without departing from the spirit of my invention as claimed.

I claim:

1. The combination of two lengths of carbon electrodes provided at their joining ends with threaded cylindrical sockets; a threaded carbon core fitting in said sockets, said adjacent ends of the carbon electrodes forming a smooth joint; a metal rod extending through the longitudinal axis of said carbon core; and means for holding said rod in position.

2. The combination of two lengths of carbon electrodes provided at their joining ends with sockets; a carbon core fitting in said sockets, said adjacent ends of the carbon electrodes forming a smooth joint; and a metal rod extending lengthwise through said carbon core.

3. The combination of two lengths of carbon electrodes provided at their joining ends with sockets; a metal rod located in said sockets; means for holding said metal rod in position; and a carbon shell surrounding the metal rod at the joint of the two electrodes.

In testimony whereof I have signed my name to this specification.

WILLIAM P. BIDELMAN.